United States Patent
Maheshwar et al.

(10) Patent No.: US 10,387,273 B2
(45) Date of Patent: Aug. 20, 2019

(54) HIERARCHICAL FAULT TOLERANCE IN SYSTEM STORAGE

(71) Applicant: Oracle International Corporation, Redwood Shores, CA (US)

(72) Inventors: Mahanteshwar Chimangala Maheshwar, Sunnyvale, CA (US); Hanlin Daniel Chien, San Jose, CA (US); Prasad V. Bagal, Saratoga, CA (US); Harish Nandyala, Fremont, CA (US); Rajiv Wickremesinghe, San Francisco, CA (US); Hemanth Pikkili, Burlingame, CA (US); Sahaj Agarwal, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/494,240

(22) Filed: Apr. 21, 2017

(65) Prior Publication Data
US 2018/0081768 A1 Mar. 22, 2018

Related U.S. Application Data

(60) Provisional application No. 62/396,059, filed on Sep. 16, 2016.

(51) Int. Cl.
*G06F 11/00* (2006.01)
*G06F 11/14* (2006.01)
(Continued)

(52) U.S. Cl.
CPC ........ *G06F 11/1471* (2013.01); *G06F 11/182* (2013.01); *G06F 11/187* (2013.01);
(Continued)

(58) Field of Classification Search
CPC .. G06F 11/00; G06F 11/1471; G06F 11/1448; G06F 11/1458
(Continued)

(56) References Cited

U.S. PATENT DOCUMENTS 6,530,035 B1  3/2003  Bridge
6,859,811 B1  2/2005  Chandrasekaran
(Continued)

OTHER PUBLICATIONS

Nitin Vengurlekar, "Oracle Automatic Storage Management: Under-The-Hood and Practical Deployment Guide", Chapter 4, Diskgroups and Failure Groups, dated Nov. 5, 2007, pp. 90-120.
(Continued)

*Primary Examiner* — Sarai E Butler
(74) *Attorney, Agent, or Firm* — Hickman Palermo Becker Bingham LLP (57) ABSTRACT

Embodiments enable a database management system (DBMS) to manage two levels of disk failure groups. These two levels of redundancy are achieved by grouping the disks of the disk group for the DBMS into two levels of failure groups (i.e., "data sites" each containing two or more "failure groups" of disks). This system of disk grouping allows a DBMS to potentially tolerate the loss of both an entire first site and part of a second site. Such a DBMS uses a multi-level voting system, based on both failure group-level votes and site-level votes, to identify the current version of administrative data structures (ADS) that store key administrative data. In addition to data sites that store database data, the DBMS includes a quorum site with a single quorum failure group that stores a copy of the ADS. The quorum site contributes a site-level vote during a multi-level voting event.

30 Claims, 5 Drawing Sheets

(51) Int. Cl.
*G06F 11/18* (2006.01)
*G06F 11/20* (2006.01)

(52) U.S. Cl.
CPC ........ *G06F 11/2094* (2013.01); *G06F 11/186* (2013.01); *G06F 2201/80* (2013.01); *G06F 2201/805* (2013.01); *G06F 2201/82* (2013.01)

(58) Field of Classification Search
USPC .............................................. 714/20, 18, 19
See application file for complete search history.

(56) References Cited

U.S. PATENT DOCUMENTS

| | | | |
|---|---|---|---|
| 7,191,357 B2 | 3/2007 | Holland et al. | |
| 7,516,348 B1 | 4/2009 | Ofer | |
| 7,577,868 B2 | 8/2009 | Aidun | |
| 8,156,195 B2 | 4/2012 | Hagglund et al. | |
| 8,219,848 B2 | 7/2012 | Branson et al. | |
| 8,627,151 B2 | 1/2014 | Vingralek | |
| 2004/0078654 A1* | 4/2004 | Holland | G06F 17/30607 714/13 |
| 2013/0268495 A1* | 10/2013 | Thiel | G06F 11/20 707/691 |
| 2015/0169415 A1* | 6/2015 | Hildebrand | G06F 3/0617 714/4.5 |
| 2017/0256328 A1* | 9/2017 | Ouyang | G11C 29/76 |

OTHER PUBLICATIONS

Freisleben et al., "Designing Multi-level Quorum Schemes for Highly Replicated Data", Fault Tolerant Systems, dated Sep. 26, 1991, Pacific Rim International Symposium on Kawasaki, pp. 154-159.
Babb Andrew et al., "Oracle? Database Oracle Database High Availability Best Practices 12c Release 1 (12.1)" dated Sep. 1, 2014, pp. 1-250.
VMWare, "Stretched Clusters and Vmware Site Recovery Manager",www.vmware.com/files/pdf/techpaper/Stretched_Clusters_and_VMware_vCenter_Site_Recovery_Manage_USLTR_Regalix., last viewed Jun. 12, 2017, 1pg.
Symantec Corporation, Transform Your Windowss® Data Center, Solve Key Storage and High Availability Challenges, Windows IT Architect and IT Director for Windows Server, dated 2012, 17 pages.
Srinivasan A., et al. "Response time analysis of fault tolerant systems using primary site approach with LCFS repair service", http://ieeexplore.ieee.org/document/369145/, viewed on Jun. 12, 2017, 3pgs.
Smart, Ian, "Understanding EMC VPLEX Technology and Key Use Cases", http://www.proact.co.uk/About_us/blog/vplex, last viewed on Jun. 12, 2017, 8 pages.
Microsoft, "Downoad Windows Server 2003/2003 R2 Retired Content from Official Microsoft Download Center", dated 2017, 5 pages.
LeftHand Networks Multi-Site HA SAN, DataSheet, Dual Redundant 21.6 TB 15K RPM SAS SAN, www.lefthandnetworks.com, dated 2008, 1 page.
HP Serviceguard Extended Distance Cluster (EDC) with VxVMCVM mirroring on HP-UX, Hewlett-Packard Development Company, dated 2008, 26 pages.
Hewlett Packard Enterprise, "HPE StoreVirtual Storage Multi-Site Configuration Guide", dated May 2016, 37 pages.
Apache Cassandra 3.0, http://docs.datastax.com/en/cassandra/3.0/, last viewed on Jun. 15, 2017, 1 page.
Nitin Vengurlekar, "Oracle Automatic Storage Management: Under-The-Hood and Practical Deployment Guide", Chapter 4 Diskgroups and Failure Groups, dated Nov. 5, 2007, 32 pages.
Hewlett-Packard Development Company, "L.P.P4000 Multi-Site HA/DR Solution Pack User Guide", dated 2009, 40 pages.
Freisleben B. et al., "Designing Multi-level Quorum Schemes for Highly Replicated Data", Fault Tolerant Systems, dated 1991, IEEE, 6 pages.
Kumar, Akhil, "Hierarchical Quorum Consensus: A New Algorithm for Managing Replicated Data", IEEE Transactions on Computers, vol. 40, No. 9, dated Sep. 1991, 9 pages.

\* cited by examiner

302 — A VOLUME MANAGER OF A DATABASE MANAGEMENT SYSTEM MAINTAINING, IN ONE OR MORE ADMINISTRATIVE DATA STRUCTURES (ADS), FAILURE GROUP MEMBERSHIP INFORMATION FOR A PLURALITY OF STORAGE UNITS STORING DATABASE INFORMATION FOR THE DATABASE MANAGEMENT SYSTEM

304 — THE VOLUME MANAGER RETRIEVING, FROM FAILURE GROUPS MAPPED TO EACH RESPECTIVE DATA SITE OF THE PLURALITY OF DATA SITES, A PLURALITY OF FAILURE GROUP-LEVEL VOTES FOR THE CURRENT VERSION OF THE ADS

306 — THE VOLUME MANAGER IDENTIFYING, FOR EACH DATA SITE OF THE PLURALITY OF DATA SITES, AND BASED ON THE PLURALITY OF FAILURE GROUP-LEVEL VOTES FROM THE DATA SITE, A SITE-LEVEL VOTE FOR THE CURRENT VERSION OF THE ADS INDICATED BY A MAJORITY OF THE PLURALITY OF FAILURE GROUP-LEVEL VOTES

308 — THE VOLUME MANAGER RETRIEVING, FROM THE QUORUM SITE, A QUORUM SITE-LEVEL VOTE FOR THE CURRENT VERSION OF THE ADS

310 — BASED ON THE VERSION OF THE ADS INDICATED BY A MAJORITY OF SITE-LEVEL VOTES FROM THE PLURALITY OF DATA SITES AND FROM THE QUORUM SITE, THE VOLUME MANAGER IDENTIFYING THE CURRENT VERSION OF THE ADS

312 — BASED, AT LEAST IN PART, ON IDENTIFYING THE CURRENT VERSION OF THE ADS BASED ON THE VERSION OF THE ADS INDICATED BY THE MAJORITY OF SITE-LEVEL VOTES, THE VOLUME MANAGER MANAGING THE DATABASE INFORMATION FOR THE DATABASE MANAGEMENT SYSTEM USING THE IDENTIFIED CURRENT VERSION OF THE ADS

HIERARCHICAL FAULT TOLERANCE IN SYSTEM STORAGE

BENEFIT CLAIM

This application claims the benefit of Provisional Application No. 62/396,059, filed Sep. 16, 2016, the entire contents of which is hereby incorporated by reference as if fully set forth herein, under 35 U.S.C. § 119(e).

FIELD OF THE INVENTION

The present invention relates to improving database redundancy protection provided by a single redundancy solution and, more specifically, to a single volume manager mirroring data stored within a disk group that serves a database management system using two levels of failure groupings, and identifying the current version of key administrative data using multi-level voting based on the two levels of failure groupings.

BACKGROUND

One way that database administrators ensure the availability and integrity of data stored by a database management system is by storing data redundantly, i.e., storing and maintaining multiple copies of the database data. Storing data redundantly allows a database management system to be tolerant of data loss to a certain degree. For example, a database management system that stores a copy of a particular file on a first data structure and stores another copy of the particular file on a distinct second data structure only loses the particular file when both the first and second data structures are lost. Thus, the database management system in the given example is tolerant of the loss of one of the first and second data structures, but is not tolerant of the loss of both data structures.

In some cases, database administrators are required to protect data maintained by a database management system by creating redundant copies of the data at multiple sites, where each site is located in a distinct location from the other sites. For example, a system administrator maintains storage for a database management system at one site in a first geographical city and more storage for the database management system in another site in a second geographical city. As another example, a system administrator maintains the first site in a first fire cell within a building and the other site in another fire cell in the same building. Data that is stored redundantly at multiple sites protects against data loss resulting from physical threats, such as fire, earthquake, etc.

Traditional storage redundancy, such as Redundant Array of Independent Disks (RAID), is deployed in one of two ways: a) across a number of failure groups within the same site, or b) across two different sites. None of the traditional RAID technologies can accomplish both storage redundancy across multiple sites where each site encompasses multiple failure groups. Thus, in order to tolerate the loss of an entire site and the concurrent loss of a portion of the storage units at a second site, database administrators must implement redundancy across the multiple sites and also redundancy with the sites by layering multiple technologies.

Database administrators layer multiple technologies to redundantly store database data based on the desired data fault tolerance, and may use one technology to protect across two different sites and use another technology to protect across failure groups within a given site. For example, a database administrator (that manages a database management system with redundant data across two sites) deploys a storage array at each site and additionally uses RAID 1 to mirror data across the two sites. The storage array provides redundancy within a site (which allows toleration of the loss of some storage units within the site), whereas RAID 1 mirrors the two sites as a whole.

It can be difficult to combine and manage multiple redundancy solutions for a single database management system. For instance, these kinds of layered redundancy solutions require a database administrator to manage two different redundancy solutions for a single database management system, which increases the management overhead of the system and also increases the chance for misconfiguration. It would be beneficial to have a streamlined single solution that provides data redundancy both across multiple sites within the sites themselves.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

One or more embodiments enable a volume manager of a database management system (DBMS) to manage both of two levels of redundancy in a disk group serving the DBMS. These two levels of redundancy are achieved by grouping the disks of the disk group into two levels of failure groups, i.e., two or more "data sites", each of which encompass two or more "failure groups". This system of disk grouping may be used to create redundancy across multiple sites (which may be physically separated) and also across multiple failure groups within each site, allowing the system to potentially tolerate the loss of an entire first site at the same time as losing a portion of the storage units in a second site.

Furthermore, according to one or more embodiments, a DBMS with two levels of failure groups employs a multi-level voting system, based on both failure group-level votes and site-level votes, to identify the most current version of an administrative data structure (ADS) that stores key administrative data, such as the Partnership and Status Table and/or voting files, etc. In addition to data sites that store data maintained by the DBMS, the DBMS includes a quorum site with a single quorum failure group that stores a copy of the ADS. The quorum site contributes a site-level vote during a multi-level voting event.

Further, each data site, which stores database data maintained by the DBMS, stores a plurality of copies of the ADS, where each copy of the ADS is stored within a distinct failure group of the data site. A database management system may automatically add a quorum failure group, that stores a copy of the ADS, to a data site to increase the number of copies of the ADS stored within the data site.

Administrative Data Structures

Figure 1:
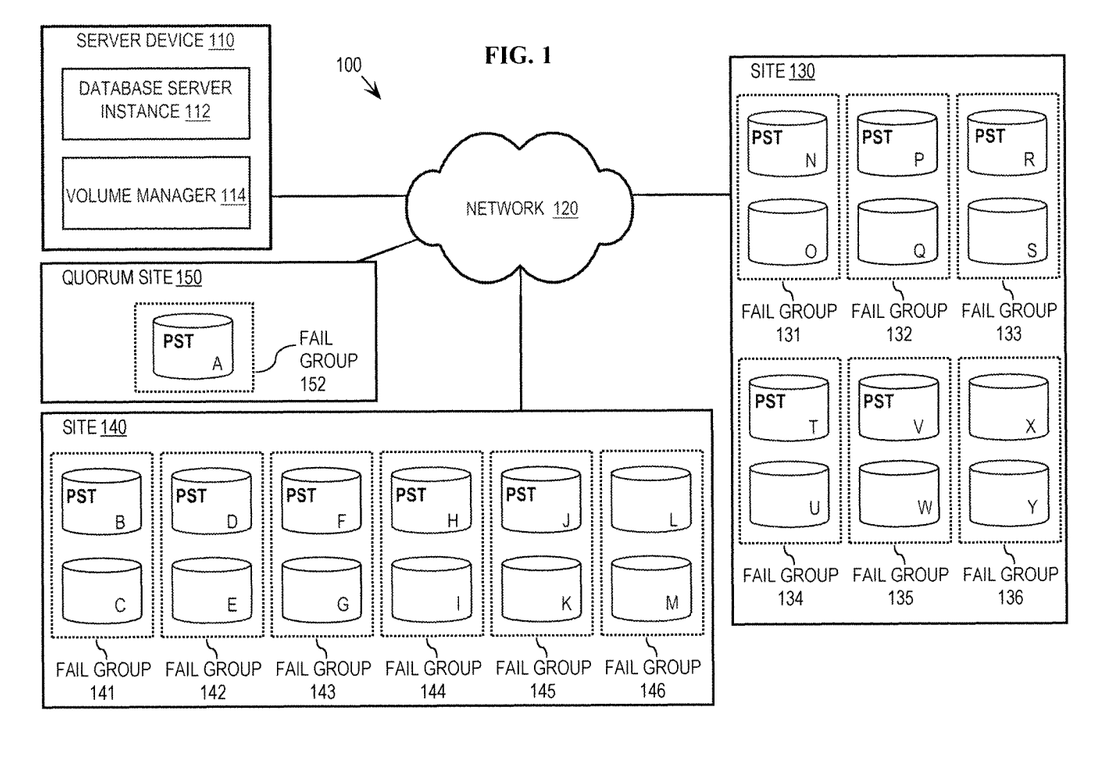
FIG. 1 is a block diagram that depicts an example database management system.

FIG. 1 depicts an example resource arrangement for a DBMS 100 in which a server device 110 hosts a database server instance 112, which logically manages user data maintained by DBMS 100, and also a volume manager 114, which manages the disk group that serves DBMS 100 (which encompasses disks "A"-"Y" of FIG. 1) and also manages how data is stored within the disk group. The user data may be any data that a user chooses to maintain within DBMS 100.

Volume manager 114 stores data for DBMS 100 in storage units. Storage units (or "storage media") are physical computer storage devices that can be utilized to persistently store data. Storage units may be disks, disk drives, racks of disks, arrays of disks, block storage, or any other physical computer storage device that can be utilized to persistently store data. All of the storage units that belong to a particular database management system are referred to herein as a "disk group". References made herein to storage units as "disks" are exemplary and do not limit embodiments to storage units that are a particular kind of storage device.

Volume manager 114 tracks information about the storage units of system 100 in one or more ADSs, which track information about the identity, status, and group membership (discussed in further detail below) of storage units within system 100. One example of an ADS is the Partnership and Status Table (PST), which stores one or more of the following information about disks in the disk group that serves DBMS 100: disk number, disk status, partner disk number, heartbeat information, and failure group information. References herein to the PST are exemplary, and any form of an ADS may be utilized in the place of a PST according to embodiments.

Another example of an ADS is a voting file. According to embodiments, a voting file stores metadata about the nodes of a cluster of nodes (if any) that includes server device 110. Specifically, the metadata in the voting file indicates which nodes are members of such a cluster of nodes, and the latest heartbeat from the nodes, etc. Information in a voting file may further be used to detect split scenarios in the cluster. The voting file may be co-located with copies of the PST stored in the disk group, or may be part of the PST. When applicable, the metadata included in the voting file references the disk group, failure groups, data sites, and quorum sites in a manner that is similar to what is described in connection with the PST herein.

In the example configuration of system 100, volume manager 114 stores a copy of the PST within several disks of the disk group. According to embodiments, each data site within system 100 stores at least one copy of the PST. Volume manager 114 updates and maintains all copies of the PST to reflect the current state of the disk group. For example, volume manager 114 updates the PST upon creation of a disk group, or whenever the disk group configuration changes, such as because of addition or removal of a disk, because of a change of the state (e.g., failure) of a disk in the disk group, etc. As such, volume manager 114 determines disk status and disk group membership using the information in the PST.

Failure Groups And Data Sites

Figure 2:
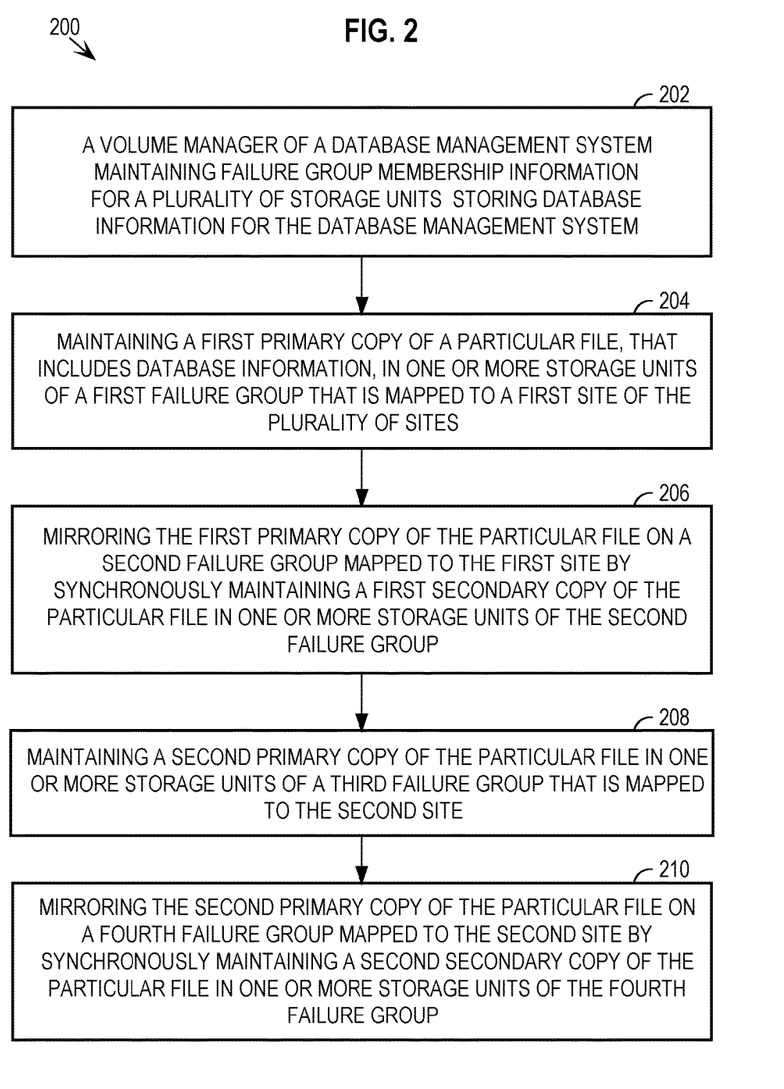
FIG. 2 depicts a flowchart for mirroring data across both failure groups and across sites.

According to embodiments, copies of files are maintained within disks, of a disk group, that are organized into two levels of failure groups. These two levels of failure groups include two or more "data sites" that store user data for the DBMS, each of which encompass two or more "failure groups". FIG. 2 depicts a flowchart 200 for mirroring data across both failure groups and across sites.

At step 202 of flowchart 200, a volume manager of a database management system maintains failure group membership information for a plurality of storage units storing database information for the database management system. According to embodiments, the failure group membership information includes at least both: membership information indicating, for each of a plurality of failure groups, a set of storage units, of the plurality of storage units, that belong to the failure group; and mapping information that maps each failure group, of the plurality of failure groups, to a particular site, of a plurality of sites. For example, volume manager 114, of DBMS 100 depicted in FIG. 1, maintains multiple copies of a PST, i.e., within each of failure groups 152, 141-145, and 131-135.

Volume manager 114 stores, within each of the copies of the PST, information about the failure group to which each disk, in the disk group serving DBMS 100, belongs. In the example arrangement depicted in FIG. 1, the disks within the disk group serving DBMS 100 are each assigned in pairs to failure groups, excepting a single disk "A" that is assigned to failure group 152 within quorum site 150, which is described in further detail below. As such, each of the current copies of the PST include metadata indicating that disks "B" and "C" are assigned to failure group 141, disks "D" and "E" are assigned to failure group 142, etc.

Each failure group of system 100 is assigned a set of disks having the same failure characteristics. Failure characteristics may be physical characteristics, such as being in the same encasement, being on the same network, being on the same storage rack, etc. According to embodiments, an administrator may assign less than all of a set of disks having a common physical failure characteristic (such as being on the same storage rack) to a given failure group.

Furthermore, a failure characteristic may be a logical failure characteristic rather than a physical characteristic, where a logical failure characteristic stems from arrangement of data on the disks of a failure group. Specifically, according to embodiments, files are striped across multiple disks within a failure group. This allows I/O hardware to access and write chunks of a file in parallel rather than writing and reading the entire file serially from a single disk, which takes longer than reading/writing to the file chunks in parallel. Volume manager 114 only stripes a particular file across disks that are in the same failure group. In this way, failure of a single disk only compromises data stored within the failure group of the failed disk and does not affect the integrity of data stored on other failure groups.

Since data is striped across many or all disks in a failure group (and there is a high probability that at least one file stored in the failure group is striped across all disks in the failure group), then the disks of the failure group have a common logical failure characteristic because corruption of a single disk of the failure group corrupts the data of the entire failure group. According to embodiments, a failure group includes at least one disk and there is no limit to the number of disks that may be assigned to a given failure group.

According to embodiments, DBMS 100 also assigns failure groups to sites. A site is a logical construct that represents a level of hierarchy between a disk group and a failure group of disks. In other words, the disks of a disk group are divided into multiple sites, and the disks in each site are, in turn, assigned to one or more failure groups.

An administrator may define a first site of system 100 to include all disks that are located in a first physical location, and a second site of system 100 to include all disks that are located in a second physical location. The two physical locations may be physically separated, e.g., by distance and/or by separation using a physical barrier, such as a fire cell wall. Notwithstanding the potential physical separation of sites, sites are communicatively connected via a network connection, as depicted in FIG. 1.

Continuing with the explanation of step 202, of flowchart 200, volume manager 114 stores, within the PST, mapping information that maps each failure group, of DBMS 100, to a particular site. According to the embodiment depicted in FIG. 1, each of the disks in the disk group serving DBMS 100 are assigned to one of sites 130, 140, and 150. Thus, each of the current copies of the PST stored within the disk group serving DBMS 100 store mapping data that maps failure groups 141-146 to site 140, failure groups 131-136 to site 130, and quorum failure group 152 to quorum site 150.

Furthermore, FIG. 1 depicts an equal number of resources at data site 130 and at data site 140. Practically, it is most useful to have the same amount of storage assigned to sites that mirror each other, since the data sites mirroring each other are limited to the amount of data that may be stored by the data site with the smallest capacity.

Mirroring

Volume manager 114 causes data to be redundantly stored, among the failure groups mapped to a particular data site, a configurable number of times, such as two or three. Thus, multiple copies of a given file, stored within a data site, are respectively maintained within same number of failure groups of the data site. Each failure group of a data site only holds one copy of any given file stored to the data site. Thus, volume manager 114 maintains any given data file, stored within the disk group serving DBMS 100, by synchronously performing steps 204-210 described in further detail below. Volume manager 114 performs these steps synchronously by causing all of the steps (or a substitute action for one or more of the steps) to be performed prior to declaring a particular action (such as a data update) on a data file complete.

Continuing with the explanation of flowchart 200, at step 204, the volume manager maintains a first primary copy of a particular file, that includes database information, in one or more storage units of a first failure group that is mapped to a first site of the plurality of sites. For example, volume manager 114 receives, from database server instance 112, a command to update a particular data file that has already been stored within DBMS 100. Volume manager 114 maintains information about the locations of the particular file. This maintained location information indicates that a primary copy of the file is stored on failure group 141 within site 140. Volume manager 114 maintains the primary copy of the particular data file by updating the copy of the particular data file that is stored on failure group 141 in site 140, as indicated by the received update command.

According to an embodiment, volume manager 114 stripes one or more files maintained by DBMS 100 across both disks of the assigned failure group, where each of the assigned disks stores a portion of the particular file. According to embodiments, volume manager 114 stores all of the data for a copy of one or more files maintained by DBMS 100 completely within one of the disks assigned to the failure group.

At step 206, the volume manager mirrors the first primary copy of the particular file on a second failure group mapped to the first site by synchronously maintaining a first secondary copy of the particular file in one or more storage units of the second failure group. For example, the location information maintained by volume manager 114 indicates that a secondary copy of the particular file is stored within failure group 146 in the same site 140. Volume manager 114 maintains the secondary copy of the particular data file by updating the copy of the particular data file that is stored on failure group 146 in site 140, as indicated by the received update command.

The mirrored copy of the file, stored within failure group 146, is maintained synchronously with the copy of the file stored within failure group 141. In other words, any changes made to the primary copy of the file stored within site 140 is also made to all copies of the file within the disk group, including the secondary copy of the file stored within site 140 (or, according to one or more embodiments, a substitute action is performed with regard to one or more of the primary and secondary copies) prior to considering the update operation a success.

Because no two copies of any given file are stored within a single failure group, a data site only fails if a critical number (which is more than one) of failure groups within the site fail. Since the data of any given copy of a file is only striped across the disks of a single failure group, and each failure group has at least one other failure group that mirrors the data of the failure group, it takes the failure of at least two (and many times more) failure groups within a site to compromise the entire site.

In addition to mirroring a file within a data site, volume manager 114 also mirrors data from data site 140 to a second data site 130 within system 100. In the context of flowchart 200, the volume manager mirrors data, stored to the first site, to a second site of the plurality of sites by performing steps 208-210.

At step 208, the volume manager maintains a second primary copy of the particular file in one or more storage units of a third failure group that is mapped to the second site. Continuing with the example above, the location information maintained by volume manager 114 indicates that a second primary copy of the particular file is stored within failure group 131 of site 130. Volume manager 114 maintains the primary copy of the particular data file on failure group 131 by updating the copy of the particular data file that is stored on failure group 131 in site 130, as indicated by the received update command.

According to one or more embodiments, volume manager 114 does not assign particular failure groups to mirror each other across the different data sites. The lack of assignment of the failure groups of one site to mirror the failure groups of the other site allows for flexibility in mirroring data between sites.

At step 210 of flowchart 200, the volume manager mirrors the second primary copy of the particular file on a fourth failure group mapped to the second site by synchronously maintaining a second secondary copy of the particular file in one or more storage units of the fourth failure group. For example, the location information maintained by volume manager 114 indicates that a secondary copy of the particular file is stored within failure group 133 in the same site 130. Volume manager 114 maintains the secondary copy of the particular data file by updating the copy of the particular data file that is stored on failure group 133 in site 130, as indicated by the received update command.

The mirrored copy of the file, stored within failure group 133, is maintained synchronously with the copy of the file stored within failure group 131. In other words, any changes made to the primary copy of the file stored within site 130 is also made to the secondary copy of the file stored within site 130 (or a substitute action is performed with regard to one or more of the primary and secondary copies) prior to considering the update operation a success.

At times, not all copies of a given file are available at the time an update is made to the copies of the file. When one or more copies of a file that is being updated are unavailable, volume manager 114 performs a substitute action for the unavailable copies, which substitute action satisfies the requirements of synchronously maintaining all copies of the file, as described in connection with flowchart 200.

For example, a substitute action that may be performed for an unavailable copy of a file is volume manager 114 recording, in metadata, that the unavailable copy of the file is stale. Based on this recorded metadata, the next time the stale copy of the file becomes available, volume manager 114 updates the file with the changes that have been made to the other copies of the file, i.e., based on a change log that logs changes made to files in system 100. While a given copy of the file is stale, volume manager 114 does not use that copy of the file to respond to read requests for the file. According to one or more embodiments, an action on a given file is only considered a success if at least one of the copies of the file is available when the change is made.

Dependent on disk availability, volume manager 114 may, at any given time, access any location within sites 130 and 140 at which a copy of the data file is stored in order to retrieve the current version of the file. If volume manager 114 attempts to read from a first copy of the file, and the file is unavailable or stale, volume manager 114 immediately and automatically attempts to read from a different copy of the file, and then from another, as needed, until volume manager 114 identifies and reads an available and current copy of the file.

The unavailability of one or more copies of the file is not exposed to the requester of the file unless all copies of the file are unavailable. For example, database server instance 112 requests the particular file (described in connection with flowchart 200) from volume manager 114. Volume manager 114 retrieves a valid copy of the file from any one of the four copies of the file maintained within failure groups 141, 146, 131, or 133 and returns the copy of the particular file to database server instance 112 without requiring database server instance 112 to have any information about the underlying structure of the data. In other words, the structure of the file system in which database data is stored is transparent to database server instance 112.

Disk Partnering

Continuing with the previous example, since copies of the particular file are stored within both of failure groups 141 and 146 within site 140, site 140 can tolerate the loss of either of failure group 141 or 146 (but not both) and still maintain one valid copy of the particular file within the site.

Assuming a requirement of two copies of all files within any given site, and without any constraints on which two failure groups the required two copies of a file may be saved to, there is a large number of combinations of failure groups that may be storing copies of any given file. Because of the large number of combinations of potential storage locations for any given file, there is an increased probability that any double failure (i.e., failure of any two failure groups in site 140) will result in the loss of both copies of at least one file stored by site 140. With an increased number of failure groups, there is an increased probability that any double failure would cause data loss for a site. The described requirement of storing two copies of all files within a site is an example used to illustrate a principle. According to one or more embodiments, volume manager 114 may maintain any number of copies of files within a site, including one, two, and three copies of each file.

As such, according to embodiments, volume manager 114 limits which failure groups a secondary copy of a file may be placed on based on the placement of the primary copy of the file within the site. In other words, volume manager 114 partners any given failure group with one or more other partner failure groups in the same site (which comprises less than all of the failure groups mapped to the site), where the secondary copies of any file that has a primary copy stored at the given failure group must be stored in one of the partner failure groups. In the example used to illustrate flowchart 200, failure groups 141 and 146 are partner failure groups within site 140, and also failure groups 131 and 133 are partner failure groups within site 130.

According to embodiments, volume manager 114 records, in the PST, partnering information that identifies failure group partnerships. Thus, all current copies of the PST within system 100 that are the latest version of the PST reflect the recorded information. Volume manager 114 determines to store the secondary copy of a file, which has a primary copy stored on failure group 141, to failure group 146 based at least in part on this partnering information. Further, volume manager 114 determines to store the secondary copy of a file, which has a primary copy stored on failure group 131, to failure group 133 based at least in part on this partnering information. Using failure group partnering, volume manager 114 reduces the probability that a double failure will result in the loss of all copies of any given file.

According to embodiments, volume manager 114 chooses failure groups that have different physical failure characteristics. For example, volume manager 114 determines that failure groups 141 and 146 are on different disk racks (either based on probability or based on known information about the physical configuration of the failure groups) and, based at least in part on this determination, assigns failure groups 141 and 146 to be partner failure groups. As such, if the disk rack that contains disks for failure group 141 is damaged or unplugged, it is likely that the second copy will remain online since it is stored within disks on a different physical disk rack. A disk rack is a set of disks that are all powered from the same power source.

Volume manager 114 determines that two failure groups have a high probability of being located within the same disk rack when orderable identifiers of the disks in a first failure group are ordered closely to the identifiers of the disks in the other failure group. Specifically, many times, administrators assign names to disks in order of the locations of the disks. Such disk names imply the locations of the disks.

According to embodiments, failure group partnering is done within the same site. According to embodiments, data stored on a particular disk within one site may be mirrored on any one or more disks in a second site of the system without requirement that data from a particular failure group within a first site be necessarily stored to any particular "partnered" failure group within the second site.

Mirroring of PST Data

In order to preserve the PST, volume manager 114 stores copies of the PST within multiple failure groups within each data site, and also within at least one quorum site. Each failure group that stores a copy of the PST has only one copy of the PST, which ensures that the loss of any given failure group will only result in the loss of at most one copy of the PST. There may be failure groups that do not store a copy of the PST, such as failure groups 146 and 136 of FIG. 1. According to embodiments, each data site includes at least one failure group that stores a copy of the PST.

In general, in order to tolerate n number of failures within a given site, there must be 2n+1 copies of any given data within the system. Thus, in order to guarantee toleration of the failure of two failure groups within a given data site, there must be five copies of the PST within the site. With five copies of a PST within five different failure groups, if two failure groups that that store the PST within a given site become corrupted, there are three remaining uncorrupted failure groups within that site that store the PST. Thus, it is still possible for such a site to produce a majority in the failure group-level vote regarding which copy of the PST is most current, as described in detail below. In FIG. 1, each of data sites 130 and 140 store five copies of the PST, i.e., within failure groups 141-145 of site 140 and within failure groups 131-135 of site 130. According to embodiments, any given data site stores at most five copies of the PST.

Quorum Site

According to embodiments, at least one quorum site is included in a database management system. According to embodiments, a quorum site includes one or more quorum failure groups, each storing a copy of the PST. According to embodiments, a quorum failure group is an administrative failure group that stores the ADS and is not used to store user data for the DBMS. User data is data that users cause to be maintained within the database management system.

FIG. 1 depicts a quorum site 150 that is mapped to a single quorum failure group 152. A quorum site is a site that is mapped to one or more quorum failure groups, each of which stores a single copy of the PST. Thus, quorum failure group 152 includes enough information for quorum site 150 to cast a site-level vote for the latest version of the PST, as described in detail below.

Adding/maintaining a quorum failure group is relatively inexpensive, since the quorum failure group need only store the relatively small ADS. For example, a quorum failure group may be implemented by an NFS-mounted file system that stores only the needed ADS (since no user data is stored on a quorum failure group). A quorum failure group has isolated failure characteristics with respect to the other failure groups of the system.

According to embodiments, an administrator may add a quorum failure group to a data site (i.e., a site that stores user data). Adding a quorum failure group to a data site can serve to increase the number of failure groups within the data site to reach a minimum number of failure groups per site required to ensure the stability of the DBMS. For example, in a system that includes two data sites, where each data site includes only two failure groups, an administrator of that system provisions one or more additional quorum failure groups within each of the sites to increase the number of failure groups in the sites to a minimum of three failure groups. Since each quorum failure group is configured to store a copy of the ADS, this addition of at least one quorum failure group storing a copy of the ADS to each site increases the stability of the system by making an odd number of entities that can vote on the most current version of the ADS within the system, as described in detail below.

According to one or more embodiments, in a system that includes a data site with only two failure groups, an administrator of that system provisions two or more additional quorum failure groups within the site. The administrator does not cause a copy of the ADS to be stored to all of the additional quorum failure groups, resulting in one or more "unused" quorum failure groups. In such embodiments, upon the volume manager of the system detecting the failure of a quorum failure group that stores a copy of the ADS within the site, the volume manager automatically creates a copy of the ADS within one or more of the "unused" quorum failure groups. According to such embodiments, the "unused" quorum failure groups serve as backup quorum failure groups to guard against failure.

According to embodiments, volume manager 114 determines that a particular data site within a DBMS, stores less than five copies of the ADS (not depicted in FIG. 1). In response to determining that the particular data site stores less than a minimum number of copies of the ADS (e.g., five), volume manager 114 determines whether any failure group within the particular data site does not yet contain a copy of the ADS. If there is a failure group within the particular data site that does not yet contain a copy of the ADS, then volume manager 114 automatically stores a copy of the ADS to the failure group to increase the number of copies of the ADS within the site. Volume manager 114 repeats the process of identifying failure groups without a copy of the ADS and creating a new copy of the ADS on such failure groups until a minimum number of copies of the ADS are stored within the particular site.

According to one or more embodiments, a database management system may include more sites than the three sites depicted in FIG. 1. For example, a particular system includes five sites, where two of the sites are data sites and three of the sites are quorum sites. As an additional example, a particular system includes five sites, where three of the sites are data sites and two of the sites are quorum sites. Alternatively, a system that includes three data sites may include a single quorum site that is configured to cast two site-level votes. The double site-level votes are formulated as described in detail herein for a single-vote quorum site.

Distributed Voting for PST

DBMS 100 uses the information in the PST to determine which information sources (i.e., disks) to trust. Each copy of the PST stores information about all of the copies of the PST stored within the disk group, including the identities of the disks that store the PST copies and the versions of the PST copies.

However, since the PST is also stored on a potentially fallible disk, volume manager 114 must also determine which one or more copies of the PST among all stored PST copies contains trustworthy information (i.e., information that is not out of date or corrupted). Some of the PST copies may not reflect the latest changes made to the PST, e.g., if the disk storing a particular copy of the PST was unplugged during any given update of the PST. Thus, when the disk comes back online, the copy of the PST stored on the disk would not be the latest version of the PST (which is known as a "stale" copy of the PST).

Figure 3:
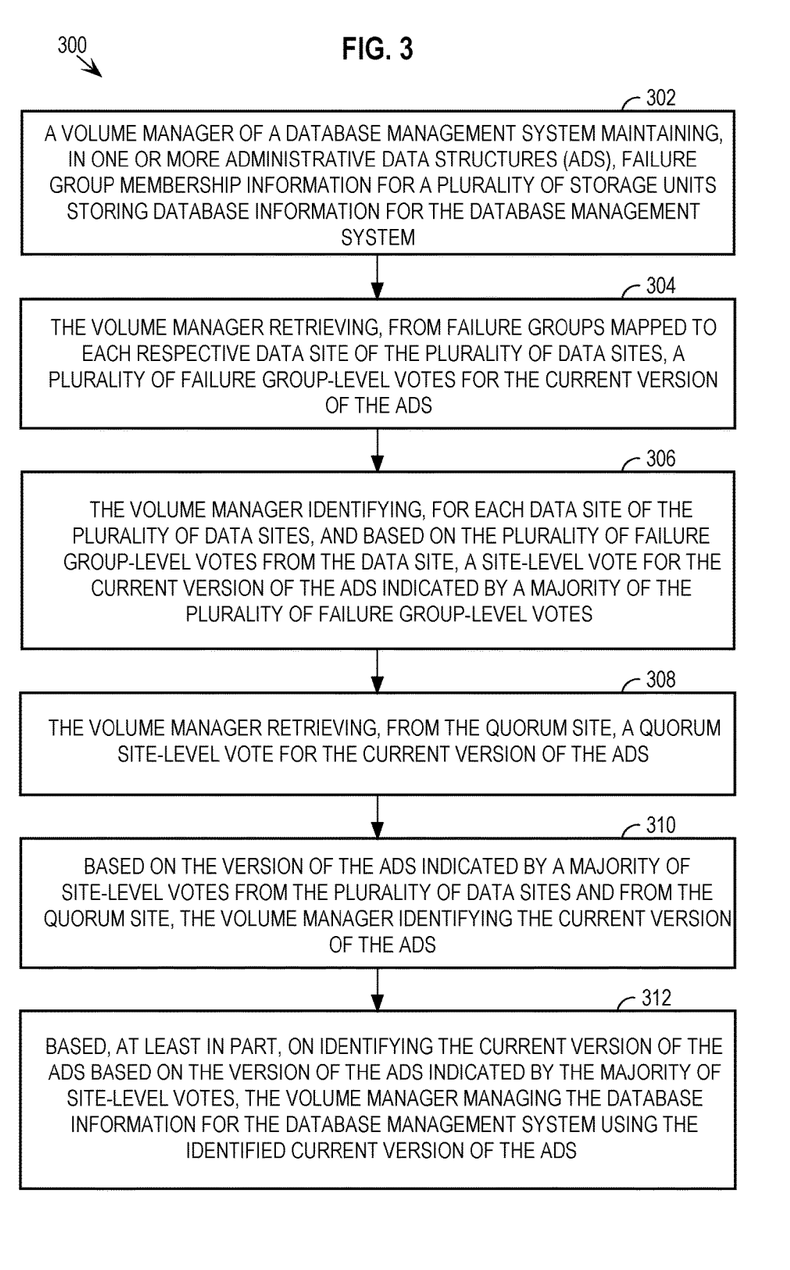
FIG. 3 depicts a flowchart for a volume manager conducting a multi-level voting event to determine what version of key administrative data, among multiple copies of the data stored by a database management system, is the current version.

At certain times, volume manager 114 must administer the database based on the information from the PST, such as when the volume manager 114 is restarted. During an initialization step of discovery of what disks are part of the disk group, volume manager 114 identifies all copies of the PST for the disk group serving DBMS 100 and runs a multi-level voting event to determine which one or more copies of the PST represent the current version of the PST. FIG. 3 depicts a flowchart 300 for a volume manager conducting a multi-level voting event to determine what version of the ADS, among multiple copies of the ADS stored by a database management system, is the current version.

At step 302, a volume manager of a database management system maintains, in one or more administrative data structures (ADS), failure group membership information for a plurality of storage units storing database information for the database management system. According to embodiments, the failure group membership information includes: membership information indicating, for each of a plurality of failure groups, a set of storage units, of the plurality of storage units, that belong to the failure group; mapping information that maps each failure group, of the plurality of failure groups, to a data site of a plurality of data sites; and quorum information indicating a quorum site that is mapped to a quorum failure group. For example, as discussed above, volume manager 114 maintains, in the PST, information indicating the failure groups, data sites, and quorum sites into which the disks of the disk group serving system 100 are organized.

According to embodiments, volume manager 114 conducts a multi-level voting event to identify a current version of the ADS, among all copies of the ADS maintained within the plurality of storage units, by performing steps 304-310 of flowchart 300.

At step 304, the volume manager retrieves, from failure groups mapped to each respective data site of the plurality of data sites, a plurality of failure group-level votes for the current version of the ADS. For example, volume manager 114 retrieves, from each of data sites 130 and 140, failure group-level votes for the current version of the PST. According to embodiments, a given data site stores an odd number of copies of the PST. This allows each data site to come to a site-level majority consensus during distributed voting regarding the most current version of the PST.

Specifically, volume manager 114 retrieves, from each of failure groups 131-135 which are all of the failure groups within site 130 that store a copy of the PST, a failure group-level vote regarding the current version of the PST. Thus, volume manager 114 uses each of failure groups 131-135 as the source of a single failure group-level vote. Volume manager 114 identifies the failure group-level vote for a given failure group based on the most current information stored in and for the failure group that indicates the working version of the PST for the failure group. In like manner, volume manager 114 retrieves, from failure groups 141-145 which are all of the failure groups within site 140 that store a copy of the PST, a failure group-level vote regarding the current version of the PST.

At step 306, the volume manager identifies, for each data site of the plurality of data sites, and based on the plurality of failure group-level votes from the data site, a site-level vote for the current version of the ADS indicated by a majority of the plurality of failure group-level votes. For example, volume manager 114 determines, based on the failure group-level votes from site 130, a site-level vote that reflects the site-level majority consensus for site 130 of the current version of the PST. A site-level consensus is reached when a majority of the total number of failure groups, within a given site, that store a PST (i.e., failure groups 131-135 of site 130) vote for the same version of the PST as the most current version of the PST. Volume manager 114 also determines, based on the failure group-level votes from site 140, a second site-level vote that reflects the site-level majority consensus for site 140 regarding the current version of the PST.

According to embodiments, if at least three of the five failure groups that store a PST within a given data site cast a vote, and vote for the same version of the PST, then volume manager 114 sets the site-level vote, from that data site, for the current version of the PST to be the version of the PST identified by the majority of the votes from the failure groups. As a further illustration, if a given data site has three failure groups, then the site would have three copies of the PST, one in each failure group. In order to form a majority, two of the failure groups with copies of the PST should be available to vote at the failure group level in order for the site to be able to produce a valid site-level vote. Furthermore, if the data site has five failure groups, then (given a requirement to have as many copies of the PST as possible, up to five copies of the PST) each of the five failure groups would host a copy of the PST. In this scenario, thereof the failure groups with copies of the PST should be available to vote at the failure group level in order for the site to be able to produce a valid site-level vote.

At step 308, the volume manager retrieves, from the quorum site, a quorum site-level vote for the current version of the ADS. For example, volume manager 114 also identifies a site-level vote for quorum site 150, which is a vote for the current version of the PST based on information stored in and for quorum failure group 152 within quorum site 150.

At step 310, based on the version of the ADS indicated by a majority of site-level votes from the plurality of data sites and from the quorum site, the volume manager identifies the current version of the ADS. For example, volume manager 114 identifies the version of the PST to trust as the version of the PST that received the majority of site-level votes, from sites 130-150, during the multi-level voting event.

In the situation where the site-level votes from sites 130 and 140 do not reflect the same version of the PST, quorum site 150 acts as a tie-breaker. Because quorum site 150 maintains enough information to cast a vote for the most current version of the PST, a vote from the quorum site 150 helps create a majority of site-level votes for a given version of the PST as the most current version of the PST.

At step 312, based, at least in part, on identifying the current version of the ADS based on the version of the ADS indicated by the majority of site-level votes, the volume manager manages the database information for the database management system using the identified current version of the ADS. For example, volume manager 114 manages the disk group serving system 100, and the data stored thereon, based on the version of the PST that is identified via the majority of the site-level votes.

Recovering From Disk Failure

Given the use of both failure groups and data sites described above, embodiments can tolerate the loss of an entire site in addition to the loss of a portion of the failure groups in the second site. For example, because of the mirroring described above within system 100, the system can reliably tolerate the loss/corruption of entire site 130 and, at the same time, the loss/corruption of one or, sometimes, more failure groups in site 140 without corruption of either user data or the ADS.

However, if a data site within system 100 goes down, then it is possible that there will not be a majority consensus at the site level, since only one data site and quorum site 150 are available to cast site-level votes, and the remaining two site-level votes may result in a tie. According to one or more embodiments, if the remaining two site-level votes are not for the same version of the ADS, then volume manager 114 does not mount the disk group.

If quorum site 150 fails, then system 100 is similarly left with a potential tie at the site-level of the multi-level vote. According to one or more embodiments, in the case of an even number of site-level votes, if the site-level votes do not produce a majority-selected version of the PST (i.e., there is a tie), then volume manager 114 does not mount the disk group. In such a case, administrator intervention is required.

According to embodiments, if both quorum site 150 fails and, at the same time, a data site, such as site 130, fails, volume manager 114 solicits an administrator of DBMS 100 to identify the current version of the PST. For example, volume manager 114 detects that both quorum site 150 and data site 130 are both currently failed. According to embodiments, in response to detecting this failure, volume manager 114 sends a message to an administrator of system 100 indicating that quorum site 150 and site 130 are both down and that site 140 is the only remaining site to cast a site-level vote on which is the most current version of the PST. According to embodiments, an administrator gives permission, to volume manager 114, to make site 140 the authority on the ADS. A site that is the authority on the ADS is a site that volume manager 114 uses, in the absence of other functioning sites, to determine the current version of the PST, i.e., by the process of formulating a site-level vote, as described in detail above, based on information within the authority data site. In this example, only the site-level vote from site 140 is required in order to identify the current version of the PST when site 140 is the designated authority on the ADS. Volume manager 114 automatically reverts to the multi-level voting system described above upon recovery of one or more of the previously-failed sites.

According to embodiments, an administrator sets a value within system 100 for the attribute SITE_REPAIR_TIME, which specifies a default repair time for any given data site in the disk group. The SITE_REPAIR_TIME is used if volume manager 114 determines that an entire site, such as site 130, has failed. Upon failure of an entire site, volume manager 114 allows the amount of time indicated by SITE_REPAIR_TIME to pass before the disks in the site are considered a permanent failure. Volume manager 114 also maintains attributes for repair times for any given disk and any given failure group, respectively.

According to embodiments, the default value of SITE_REPAIR_TIME is null. With a value of null, a site that has experienced a failure will never be reconstructed without user intervention. Many times, the apparent failure of an entire data site is caused by a repairable condition, such as the failure of a network cable connection between sites. Furthermore, site failure that is caused by an event that destroys the hardware of the site would likely require an administrator to provision new hardware on which to recreate the destroyed site's data. According to embodiments, if there is a repair time specified for a disk, such as with the DROP AFTER clause of the ALTER DISK GROUP OFFLINE DISK statement, that disk repair time overrides the SITE_REPAIR_TIME.

Database Management System Architecture

As shown in FIG. 1, example DBMS 100 includes a server device 110 and sites 130, 140, and 150 communicatively coupled via a network 120. Example DBMS 100 may include other entities or devices, including client devices, server devices, and storage devices, according to embodiments. The number of disks depicted in FIG. 1 is exemplary.

Network 120 may be implemented with any type of medium and/or mechanism that facilitates the exchange of information between server device 110 and sites 130, 140, and 150. Furthermore, network 120 may facilitate use of any type of communications protocol, and may be secured or unsecured, depending upon the requirements of a particular embodiment.

Server device 110 may be implemented by any type of computing device that is communicatively connected to network 120. Server device 110 may be a node in a multi-node system or may function independently of any other nodes. In DBMS 100, server device 110 is configured with a database server instance 112 that implements the database server that manages user data maintained within system 100.

A database server instance is a server that comprises a combination of the software and allocation of resources from a node. Specifically, a server, such as a database server, is a combination of integrated software components and an allocation of computational resources, such as memory, a node (i.e., a computing device), and/or processes on the node for executing the integrated software components on a processor, the combination of the software and computational resources being dedicated to performing a particular function on behalf of one or more clients.

Server device 110 also is configured with a volume manager 114, as described in detail above. Volume manager 114 may be implemented by any volume management system (such as Oracle Automatic Storage Management) that manages a data within a disk group for a database management system. Volume manager 114 uses disk groups to store data files; a disk group is a collection of disks that volume manager 114 manages as a unit. Within a disk group, volume manager 114 exposes a file system interface for database files.

According to an embodiment, database server instance 112 and volume manager 114 both share access to database data stored within sites 130, 140, and 150. This shared access comprises access to a set of storage units and to data blocks stored thereon. Server device 110 may be configured with other mechanisms, processes and functionalities, depending upon a particular implementation.

According to one or more embodiments, each of the processes and/or functionality described in connection with database server instance 112 and volume manager 114 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Management Systems

Embodiments of the present invention are used in the context of database management systems (DBMS). Therefore, a description of a DBMS is useful. A DBMS manages a database. A DBMS may comprise one or more database servers. A database comprises database data and a database dictionary that are stored on a persistent memory mechanism, such as the storage units serving DBMS 100. Database data may be stored in one or more logical data containers. Users may interact with an instance of a database server of a DBMS by submitting, to the database server instance, commands that cause the database server instance to perform operations on data stored in a database. For example, a user at a client device submits, via a database client, a database command to database server instance 112 with which the database client maintains a connection. A user may be one or more applications running on the client device that cause the database client to interact with database server instance 112. Multiple parties may access database resources through a given application. Multiple parties and/or users may also be referred to herein, collectively, as a user.

Volume manager 114 is a computer system process executing DBMS server software that causes the process to manage the file system and storage units for DBMS 100. For example, volume manager 114 manages the file system for DBMS 100 by maintaining location information that indicates on which storage units of system 100 each data file being maintained by system 100 is found. As a further example, volume manager 114 manages the storage units for DBMS 100 by maintaining information indicating the status of the various storage units, including whether particular disks are currently unavailable. Volume manager 114 may be implemented by a volume management system such as Oracle Automatic Storage Management (ASM). More information about Oracle ASM, as an example of a volume management system, is found in "Automatic Storage Management Administrator's Guide" in the Oracle Database Online Documentation 11g Release 2 (11.2), which is hereby incorporated by reference as if fully set forth herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
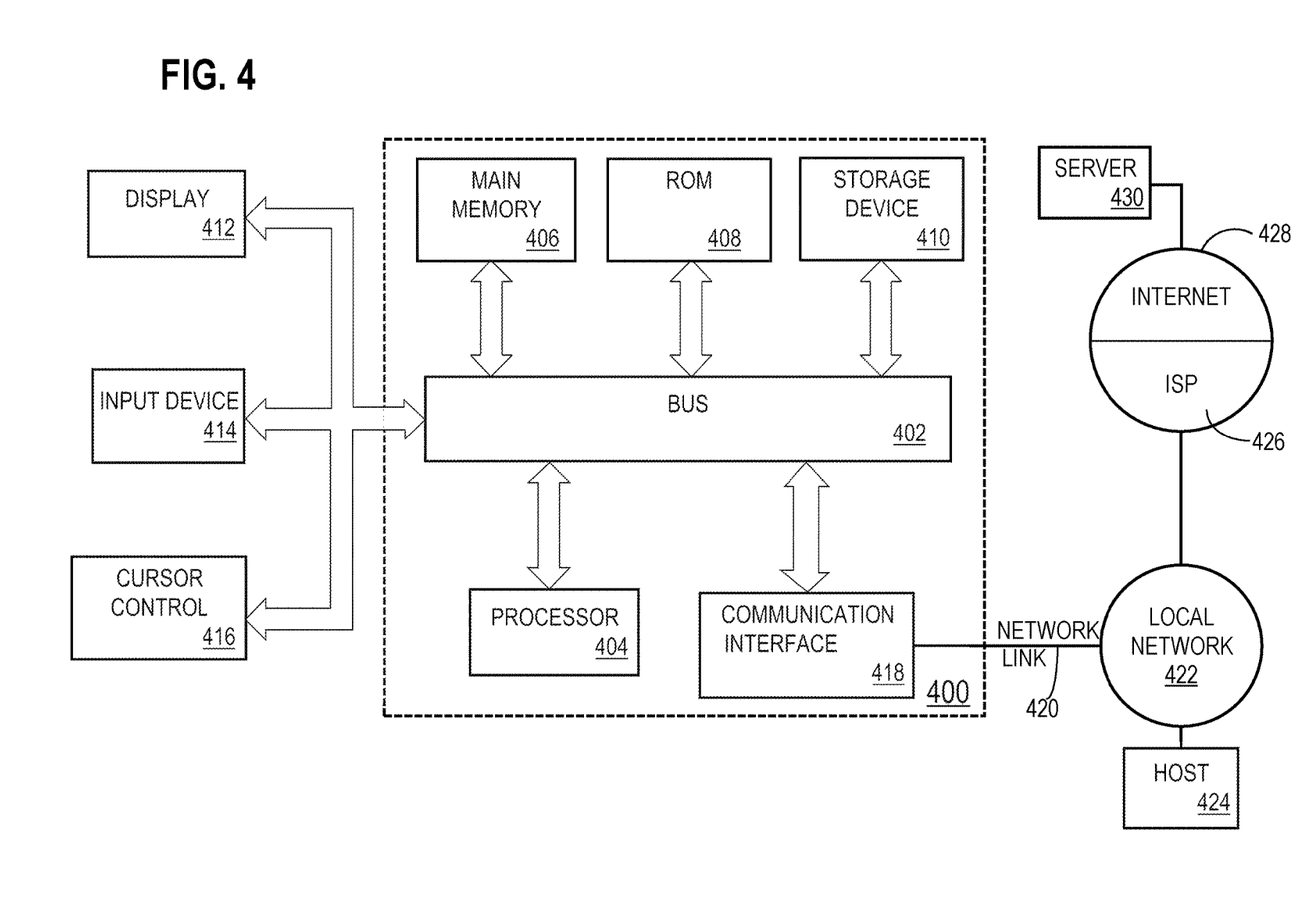
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 5:
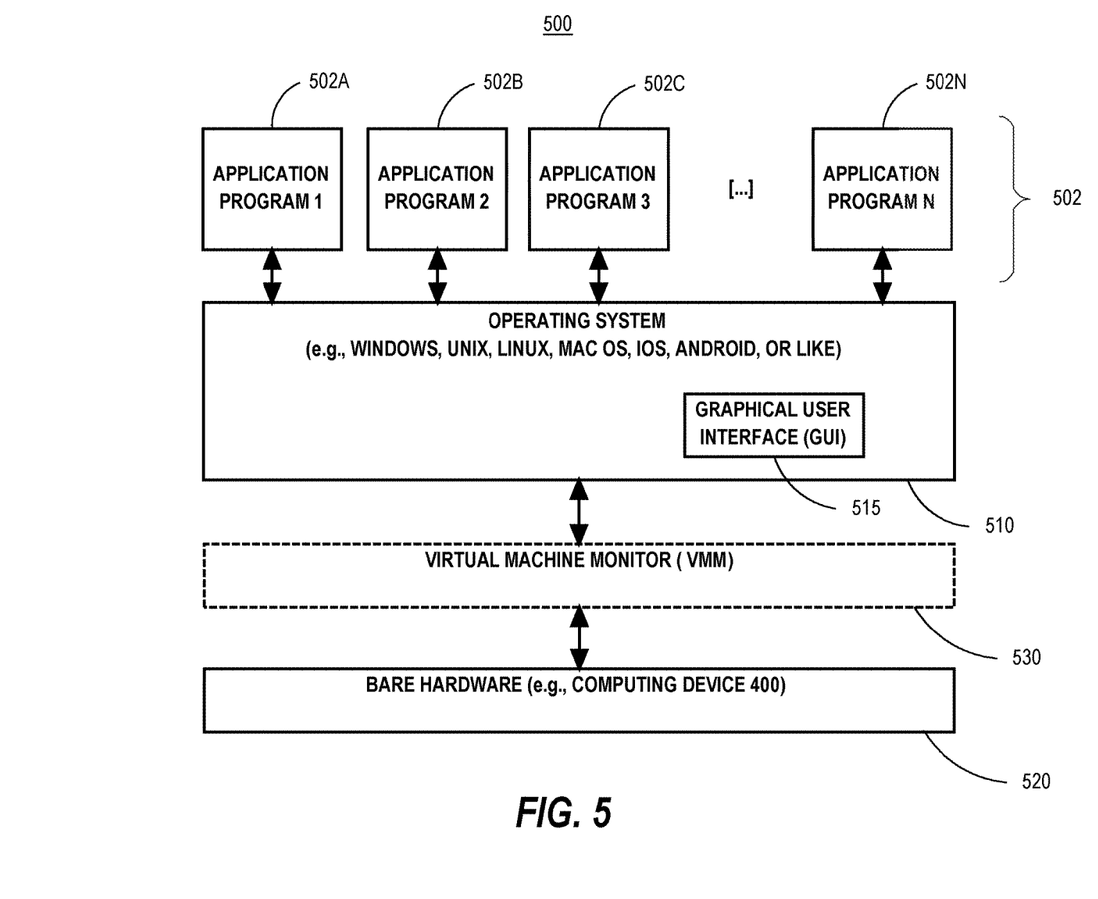
FIG. 5 is a block diagram of a basic software system that may be employed for controlling the operation of a computer system.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A computer-implemented method comprising:
    a volume manager of a database management system maintaining, in one or more administrative data structures (ADS), failure group membership information for a plurality of storage units storing database information for the database management system;
    wherein the failure group membership information includes:
        membership information indicating, for each of a plurality of failure groups, a set of storage units, of the plurality of storage units, that belong to the failure group,
        mapping information that maps each failure group, of the plurality of failure groups, to a data site of a plurality of data sites, and
        quorum information indicating a quorum site that is mapped to a quorum failure group;
    the volume manager conducting a multi-level vote to identify a current version of the ADS, among all copies of the ADS maintained within the plurality of storage units, comprising:
        the volume manager retrieving, from failure groups mapped to each respective data site of the plurality of data sites, a plurality of failure group-level votes for the current version of the ADS,
        the volume manager identifying, for each data site of the plurality of data sites, and based on the plurality of failure group-level votes from the data site, a site-level vote for the current version of the ADS indicated by a majority of the plurality of failure group-level votes,
        the volume manager retrieving, from the quorum site, a quorum site-level vote for the current version of the ADS, and
        based on the version of the ADS indicated by a majority of site-level votes from the plurality of data sites and from the quorum site, the volume manager identifying the current version of the ADS;
    based, at least in part, on identifying the current version of the ADS based on the version of the ADS indicated by the majority of site-level votes, the volume manager managing the database information for the database management system using the identified current version of the ADS;
    wherein the method is performed by one or more computing devices.

2. The method of claim 1, wherein:
    at least one failure group that is mapped to each data site, of the plurality of data sites, maintains a copy of the ADS; and
    the quorum failure group maintains a copy of the ADS.

3. The method of claim 1, further comprising:
    the volume manager determining that a particular data site, of the plurality of data sites, stores less than five copies of the ADS;
    the volume manager adding a new failure group to the particular data site;
    in response to adding the new failure group to the particular data site, and based on the particular data site storing less than five copies of the ADS, the volume manager saving a new copy of the ADS to the new failure group.

4. The method of claim 1, wherein:
    the plurality of storage units include a plurality of disks; and
    the ADS stores one or more of:
        disk identifier for each of the plurality of disks,
        status of each of the plurality of disks,
        partnership information for each of the plurality of failure groups; or
        heartbeat information for each of the plurality of disks.

5. The method of claim 1, wherein the plurality of data sites comprises an even number of data sites.

6. The method of claim 1, wherein the quorum failure group is an administrative failure group and the quorum site is only mapped to a single failure group that is the quorum failure group.

7. The method of claim 1, wherein the plurality of data sites consists of a first and second data site, further comprising:
the volume manager detecting failure of both the quorum site and the first data site;
the volume manager receiving permission, from an administrator of the database management system, to make the second data site an authority on the ADS; and
in response to receiving permission to make the second data site the authority on the ADS, the volume manager identifying the current version of the ADS based on a site-level vote for the current version of the ADS from the second data site.

8. A computer-implemented method comprising:
a volume manager of a database management system maintaining failure group membership information for a plurality of storage units storing database information for the database management system;
wherein the failure group membership information includes at least both:
membership information indicating, for each of a plurality of failure groups, a set of storage units, of the plurality of storage units, that belong to the failure group; and
mapping information that maps each failure group, of the plurality of failure groups, to a particular site, of a plurality of sites;
the volume manager maintaining a particular file that includes database information within the plurality of storage units by synchronously:
maintaining, on a configurable number of first one or more failure groups mapped to a first site of the plurality of sites, respective mirror copies of the particular file;
wherein a respective mirror copy of the particular file is maintained in one or more storage units of each respective failure group of the first one or more failure groups; and
mirroring data, stored to the first site, to a second site of the plurality of sites by:
maintaining, on a configurable number of second one or more failure groups mapped to the second site, respective mirror copies of the particular file;
wherein a respective mirror copy of the particular file is maintained in one or more storage units of each failure group of the second one or more failure groups;
wherein the method is performed by one or more computing devices.

9. The method of claim 8 wherein at least two sites of the plurality of sites are physically separate and are communicatively connected via a network connection.

10. The method of claim 8 wherein:
both a first failure group and a second failure group of the first one or more failure groups maintain respective mirror copies of the particular file;
the method further comprises:
the volume manager maintaining particular partnership information that assigns the second failure group to be a partner failure group for the first failure group;
mirroring, on the second failure group, a first primary copy of the particular file maintained on the first failure group is based, at least in part, on the particular partnership information.

11. The method of claim 10 wherein:
both a third failure group and a fourth failure group of the second one or more failure groups maintain respective mirror copies of the particular file;
the method further comprises: the volume manager maintaining second partnership information that assigns the fourth failure group to be a partner failure group for the third failure group;
mirroring, on the fourth failure group, a second primary copy of the particular file maintained on the third failure group is based, at least in part, on the second partnership information.

12. The method of claim 10 further comprising the volume manager assigning the first and second failure groups to be partners based on disks of the first failure group being located within a different physical rack than a physical rack on which disks of the second failure group are located.

13. The method of claim 8 further comprising:
the volume manager detecting failure of a particular site of the plurality of sites;
in response to detecting failure of the particular site of the plurality of sites, calculating when to reconstruct data that was stored on the failed particular site based on a site repair time attribute stored by the volume manager.

14. The method of claim 8 further comprising:
determining that one or more copies of the particular file, maintained by the volume manager, are unavailable at the time that an update is made to the particular file;
in response to determining that the one or more copies of the particular file are unavailable at the time that an update is made to the particular file, marking each of the one or more copies of the particular file as stale.

15. One or more non-transitory computer-readable media storing one or more sequences of instructions that, when executed by one or more processors, cause:
a volume manager of a database management system maintaining, in one or more administrative data structures (ADS), failure group membership information for a plurality of storage units storing database information for the database management system;
wherein the failure group membership information includes:
membership information indicating, for each of a plurality of failure groups, a set of storage units, of the plurality of storage units, that belong to the failure group,
mapping information that maps each failure group, of the plurality of failure groups, to a data site of a plurality of data sites, and
quorum information indicating a quorum site that is mapped to a quorum failure group;
the volume manager conducting a multi-level vote to identify a current version of the ADS, among all copies of the ADS maintained within the plurality of storage units, comprising:
the volume manager retrieving, from failure groups mapped to each respective data site of the plurality of data sites, a plurality of failure group-level votes for the current version of the ADS,
the volume manager identifying, for each data site of the plurality of data sites, and based on the plurality of failure group-level votes from the data site, a site-level vote for the current version of the ADS indicated by a majority of the plurality of failure group-level votes, the volume manager retrieving, from the quorum site, a quorum site-level vote for the current version of the ADS, and based on the version of the ADS indicated by a majority of site-level votes from the plurality of data sites and from the quorum site, the volume manager identifying the current version of the ADS;

based, at least in part, on identifying the current version of the ADS based on the version of the ADS indicated by the majority of site-level votes, the volume manager managing the database information for the database management system using the identified current version of the ADS.

16. The one or more non-transitory computer-readable media of claim 15, wherein:

at least one failure group that is mapped to each data site, of the plurality of data sites, maintains a copy of the ADS; and the quorum failure group maintains a copy of the ADS.

17. The one or more non-transitory computer-readable media of claim 15, wherein:

the plurality of storage units include a plurality of disks; and the ADS stores one or more of:
disk identifier for each of the plurality of disks,
status of each of the plurality of disks,
partnership information for each of the plurality of failure groups; or
heartbeat information for each of the plurality of disks.

18. The one or more non-transitory computer-readable media of claim 15, wherein the one or more sequences of instructions further comprise instructions that, when executed by one or more processors, cause:

the volume manager determining that a particular data site, of the plurality of data sites, stores less than five copies of the ADS;

the volume manager adding a new failure group to the particular data site;

in response to adding the new failure group to the particular data site, and based on the particular data site storing less than five copies of the ADS, the volume manager saving a new copy of the ADS to the new failure group.

19. The one or more non-transitory computer-readable media of claim 15, wherein the plurality of data sites comprises an even number of data sites.

20. The one or more non-transitory computer-readable media of claim 15, wherein the quorum failure group is an administrative failure group and the quorum site is only mapped to a single failure group that is the quorum failure group.

21. The one or more non-transitory computer-readable media of claim 15, wherein the plurality of data sites consists of a first and second data site, wherein the one or more sequences of instructions further comprise instructions that, when executed by one or more processors, cause:

the volume manager detecting failure of both the quorum site and the first data site;

the volume manager receiving permission, from an administrator of the database management system, to make the second data site an authority on the ADS; and in response to receiving permission to make the second data site the authority on the ADS, the volume manager identifying the current version of the ADS based on a site-level vote for the current version of the ADS from the second data site.

22. One or more non-transitory computer-readable media storing one or more sequences of instructions that, when executed by one or more processors, cause:

a volume manager of a database management system maintaining failure group membership information for a plurality of storage units storing database information for the database management system;

wherein the failure group membership information includes at least both:

membership information indicating, for each of a plurality of failure groups, a set of storage units, of the plurality of storage units, that belong to the failure group; and mapping information that maps each failure group, of the plurality of failure groups, to a particular site, of a plurality of sites;

the volume manager maintaining a particular file that includes database information within the plurality of storage units by synchronously:

maintaining, on a configurable number of first one or more failure groups mapped to a first site of the plurality of sites, respective mirror copies of the particular file;

wherein a respective mirror copy of the particular file is maintained in one or more storage units of each respective failure group of the first one or more failure groups; and mirroring data, stored to the first site, to a second site of the plurality of sites by:

maintaining, on a configurable number of second one or more failure groups mapped to the second site, respective mirror copies of the particular file;

wherein a respective mirror copy of the particular file is maintained in one or more storage units of each failure group of the second one or more failure groups.

23. The one or more non-transitory computer-readable media of claim 22, wherein:

both a first failure group and a second failure group of the first one or more failure groups maintain respective mirror copies of the particular file; and the one or more sequences of instructions further comprise instructions that, when executed by one or more processors, cause:

the volume manager maintaining particular partnership information that assigns the second failure group to be a partner failure group for the first failure group;

mirroring, on the second failure group, a first primary copy of the particular file maintained on the first failure group is based, at least in part, on the particular partnership information.

24. The one or more non-transitory computer-readable media of claim 22 wherein at least two sites of the plurality of sites are physically separate and are communicatively connected via a network connection.

25. The one or more non-transitory computer-readable media of claim 22 wherein the one or more sequences of instructions further comprise instructions that, when executed by one or more processors, cause:

the volume manager detecting failure of a particular site of the plurality of sites;

in response to detecting failure of the particular site of the plurality of sites, calculating when to reconstruct data that was stored on the failed particular site based on a site repair time attribute stored by the volume manager.

26. The one or more non-transitory computer-readable media of claim 22 wherein the one or more sequences of instructions further comprise instructions that, when executed by one or more processors, cause:
  determining that one or more copies of the particular file, maintained by the volume manager, are unavailable at the time that an update is made to the particular file;
  in response to determining that the one or more copies of the particular file are unavailable at the time that an update is made to the particular file, marking each of the one or more copies of the particular file as stale.

27. The one or more non-transitory computer-readable media of claim 23 wherein the one or more sequences of instructions further comprise instructions that, when executed by one or more processors, cause the volume manager assigning the first and second failure groups to be partners based on disks of the first failure group being located within a different physical rack than a physical rack on which disks of the second failure group are located.

28. The one or more non-transitory computer-readable media of claim 23 wherein:
  both a third failure group and a fourth failure group of the second one or more failure groups maintain respective mirror copies of the particular file;
  the one or more sequences of instructions further comprise instructions that, when executed by one or more processors, cause:
    the volume manager maintaining second partnership information that assigns the fourth failure group to be a partner failure group for the third failure group;
    mirroring, on the fourth failure group, a second primary copy of the particular file maintained on the third failure group is based, at least in part, on the second partnership information.

29. The method of claim 8 wherein the configurable number of first one or more failure groups and the configurable number of second one or more failure groups are the same configurable number.

30. The one or more non-transitory computer-readable media of claim 17 wherein the configurable number of first one or more failure groups and the configurable number of second one or more failure groups are the same configurable number.

* * * * *

UNITED STATES PATENT AND TRADEMARK OFFICE
CERTIFICATE OF CORRECTION

PATENT NO. : 10,387,273 B2
APPLICATION NO. : 15/494240
DATED : August 20, 2019
INVENTOR(S) : Maheshwar et al.

Page 1 of 1

It is certified that error appears in the above-identified patent and that said Letters Patent is hereby corrected as shown below:

On the Title Page

On page 2, Column 2, item (56) under Other Publications, Line 5, delete "Windowss®" and insert -- Windows® --, therefor.

In the Specification

In Column 9, Line 20, delete "that that" and insert -- that --, therefor.

In Column 16, Line 51, delete "communications" and insert -- communications. --, therefor.

Signed and Sealed this
Twenty-fifth Day of August, 2020

Andrei Iancu
*Director of the United States Patent and Trademark Office*